United States Patent Office 2,768,643
Patented Oct. 30, 1956

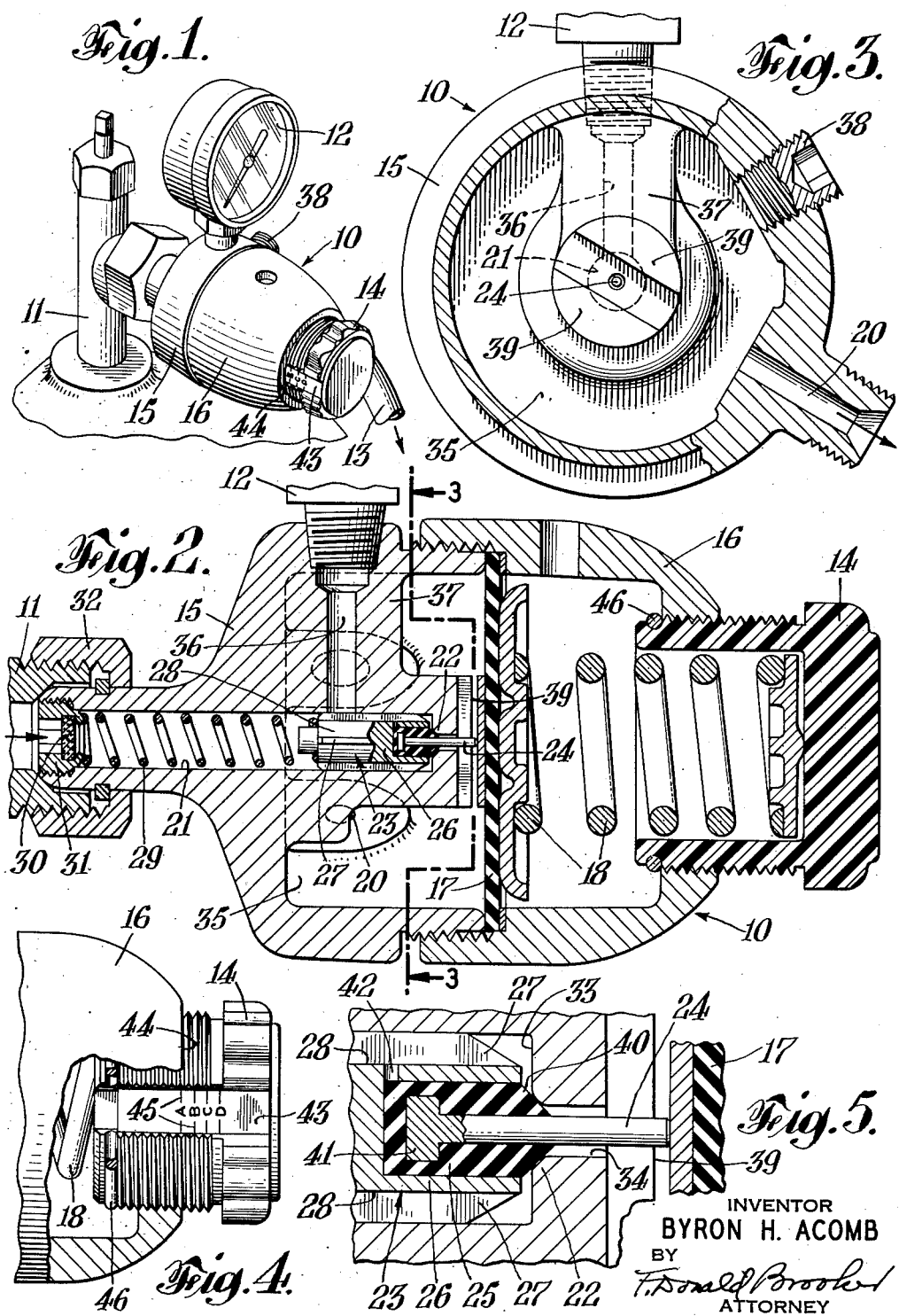

2,768,643

REGULATOR FOR OXYGEN AND OTHER GASES

Byron H. Acomb, Somerville, N. J., assignor to Union Carbide and Carbon Corporation, a corporation of New York Application June 14, 1951, Serial No. 231,565

4 Claims. (Cl. 137—505.42)

This invention relates to a fluid pressure regulator and has for an object to lessen the danger of the regulator being damaged by an incoming surge of high pressure oxygen, as may happen when a wall of some valve element of oxidizable material receives the full impact of such a surge.

Another object is to provide a more serviceable seat of plastic material and a holder therefor in which the seat material is prevented from expanding objectionably or coming away from its support. A further object is to dampen hum and and prolong the life of the seat material. Yet another object is to provide a regulator which will be efficient and enable the gas pressure cylinder to be more nearly completely discharged than do many such regulators. Still a further object is to provide a fluid pressure regulator by means of which a user can effect a return to a former setting for a discharge pressure from the regulator without the necessity of having a pressure gauge on the low pressure side.

According to this invention, a regulator passage wall, which is subjected to the impact of a surge of oxygen, is made of non-oxidizable metal such as stainless steel or bronze to reduce the danger of such wall being damaged by such a surge. The seat material receives the gas deflected from such a wall and cooperates with a stationary valve element shaped to effect a high coefficient of discharge, whereby a gas pressure cylinder may be more nearly discharged than would be possible with a lower such coefficient. A valve closing spring has a large length to diameter ratio so that when loaded its center portion will buckle and contact the inner surface of a guide enclosing the spring and thus provide friction between the spring and guide to suppress any tendency for the movable valve element to hum. An indicator cooperates with graduations on one of either the housing or the screw for establishing the loading on the pressure adjusting spring, thus enabling the pressure to be returned to a former setting without the necessity for having a pressure gauge on the discharge side of the regulator.

Referring to the drawing:

Fig. 1 is a perspective of a preferred embodiment of this invention;

Fig. 2 is a longitudinal section through the device of Fig. 1;

Fig. 3 is a section on the line 3—3 of Fig. 2;

Fig. 4 is an enlarged end view of the screw for adjusting diaphragm spring pressure with a part of the cap broken away;

Fig. 5 is an enlarged longitudinal section showing the valve seat material received within a slidable holder.

As shown in Fig. 1, regulator 10 is connected to any convenient source of gas under high pressure such as a usual storage cylinder having an outlet pipe 11. A high pressure gauge 12 is mounted above the regulator, as illustrated, and a low pressure discharge tube 13 leads away from the regulator. Pressure of the gas being discharged is controlled by an adjusting screw 14 controlling the loading of the pressure adjusting spring.

As shown in Fig. 2, the body portion 15 of the regulator has a cap 16 threaded thereon for clamping the diaphragm 17 and containing a spring 18, the pressure of which is adjustable by means of the screw 14 threaded into the cap 16. The outlet passage 20 (Fig. 3) supplies the low pressure discharge line 13, which is attached to the body portion of the casing at the end of the outlet passage 20. A high pressure inlet passage 21 is axially aligned and a valve is located between the inlet and outlet passages. This valve has a stationary element 22 and a movable element 23. A valve stem 24 projects from the movable element for actuation by the diaphragm 17, the usual diaphragm wear plate being placed between the diaphragm and the valve stem.

The movable valve element includes seat material 25 received within a slidable holder or carrier 26 having longitudinal ribs 27. Between the side walls of the ribs 27 are channels 28 through which the incoming gas is supplied. A valve closing spring 29 cooperates with a stationary filter holder at one end and with a reduced end portion of the slidable holder at the other end. The filter 30 is of any suitable material; however, if the material is a copper alloy to be used with acetylene, the copper content cannot be greater than 70%. A holder 31 for the filter is threaded into a projecting neck portion of the body and an inlet fitting 32 is attached to this neck portion whereby the regulator may be connected to some usual source of supply pressure.

It has been found in use that when a high pressure surge of oxygen, such as may result from a sudden opening of a valve, passes through the channels 28 and reaches the wall 33 around the outlet opening 34, and when the wall 33 is made of oxidizable material, such as the valve seats in normal regulator construction, the heat generated by the impact of the surge against the wall will be sufficient to oxidize or burn the wall and cause considerable damage to the regulator. For this reason, it has been found desirable to make at least the surface of the wall 33 of the valve body of stainless steel or bronze, so that the face of the wall is not readily oxidized. When a high pressure surge impinges on the wall 33, the heat of compression is dissipated to the wall and the relatively cool gas is deflected toward the tapered valve seat 25, whence it passes through the outlet opening 34 around the stem 24. Beyond the opening 34 the outlet pressure is received within an enlarged opening 35 within the body portion of the valve. A passage 36 shown in Figs. 2 and 3 leads from the high pressure supply passage 21 to the pressure gauge 12.

From Fig. 2 it will be seen the ribs 27 are not wide enough to close the passage 36 at any time. As shown in Fig. 3, surrounding the passage 36 is a rib 37 of substantial thickness. When no pressure gauge is connected on the outlet side of the regulator some convenient form of plug 38 closes the opening for such a gauge, as shown in Fig. 3. On each side of the valve stem 24 are end faces 39 for limiting the flexure of the diaphragm 17 to the left in Fig. 2, or, in other words, for limiting the opening movement the valve may be given.

The inclined end 40 of the valve seat cooperates with the stationary valve member 22 and the stationary valve member has its cooperating face rounded, as shown in Fig. 5, to produce a high over-all or regulator coefficient of discharge of at least .80 to .85. The valve stem 24 has an enlarged end 41 molded into the seat material. This seat material has a snug fit within the recess of the slidable holder and a vent 42 is located adjacent the base of such recess so that any pressure developed in forcing the seat material into its recess is relieved through the vent. The seat material for high pressure gas service is a plastic of at least about 90 durometer hardness which is substantially inert to oxygen, such as a polymer of trifluorochloroethylene, or a polymer of tetrafluoroethylene such as is sold under the Teflon brand, or a linear polyamid such as is sold under the Nylon brand. When the regulator is used with fuel gas such as acetylene which is not stored under as high pressure as is oxygen, then a softer seat material is desirable, and rubber, for example, is found suitable.

The slot 43 shown in Fig. 4 as being cut through the screw threads of the spring adjusting means 14 is provided with graduations 45 which cooperate with an end wall 44 of the cap 16, so that, in effect, the end wall 44 constitutes an index or marker. An opposite slot 43 is also provided with graduations on the opposite side of the adjusting screw. In the drawing, these graduations take the form of letters arranged a predetermined distance apart, such as some fraction or multiple of the pitch of the threads. By having the end wall 44 at one side of the adjusting screw align with a graduation such as B or some other portion between a pair of adjacent lines, it is possible to have the desired stress applied to the spring 18 without the necessity of a low pressure gauge being used on the outlet side of the regulator to preset a chosen delivery pressure.

Among the advantages of this invention may be mentioned the non-oxidizable wall 33, which is not damaged by the heat resulting from the impingement of a high pressure surge of oxygen upon it. The slidable holder for seat material is preferably .003" smaller in diameter than is the size of the inlet opening 21, and, where the friction of the three or more ribs 27 supporting the slidable holder is not sufficient to suppress hum in the diaphragm and valve, the valve closing spring 29, being of the substantial length indicated, will be found to buckle slightly causing a few convolutions to engage the wall of the guide passage 21 through which the high pressure gas enters the valve, and such additional friction has been found desirable in suppressing hum. With the graduations indicated and a corresponding index or reference point on the cap 16, now low pressure gauge is needed in order to have the diaphragm spring placed under the desired stress to obtain a predetermined outlet pressure. In fact, instead of letters, the graduations 45 might be made in terms of outlet pressure desired. The seat material, being received within the recess of the slidable holder, is prevented from expanding and sticking in the guide tube or supply opening 21. If the seat material occupied substantially the full width of the guide 21 and were of the same size as the slidable holder, there is always the possibility that moisture in the oxygen or oils in the fuel gases might be absorbed to cause the seat material to expand and render the valve less sensitive or inoperative. There is always the possibility that the gas may enter between the seat material and the walls of its recess to the base of the seat and cause the seat to be forced out of its recess to an objectionable amount, if the inlet gas is rapidly shut off. Thus the vent 42 serves another purpose in that the pressure on all sides of the seat material is nearly equalized. With the enlarged end 41 molded in the seat material, the stem is firmly anchored and a serviceable valve results. Having the stationary wall 22 rounded where it cooperates with the inclined seat material not only gives a good coefficient of discharge but enables the seat to wear far longer than if a sharper cooperating wall were used. Even in the case of excessive wear to the seat material, the adjacent end of the slidable holder will cooperate with the wall 33 and form a metal to metal contact that is useful in closing the valve, though not as satisfactory as the intended type valve closing. The enlarged end 41 of the stem transmits the thrust of the diaphragm to the seat material and tends to further assist holding the seat material within its recess. The inlet and outlet fittings are attached to the body portion of the regulator, which in this case is structurally integral, thereby eliminating the costs of soldering and attaching one or more such fittings. The valve closing spring 29 is located upstream from the movable valve element and is thus protected from damage due to the heat of impact of an aforementioned oxygen surge. The valve seat and its slidable holder as well as the valve closing spring are inserted and removed through the inlet pasage 21. A ring 46 prevents the adjusting screw 14 from being backed off from the cap 16. In the usual regulator construction any surge of oxygen impinges against a surface of an oxidizable valve seat and not against a stationary wall of non-oxidizable material. As shown in the drawing, when the wall 33 is generally flat and substantially normal to the direction of any incoming surge of oxygen, the wall will absorb much of the heat energy of impact rather than reflect the surge onto the valve seat. Also according to the approximate dimensions illustrated for the seat holder of Fig. 2, its ratio of diameter to effective length for guiding it within the inlet passageway is about 1 to 1.75. Such length to the seat holder insures the valve stem being accurately guided and not tilted out of alignment as might occur were the holder of much shorter length compared to its diameter. The filter 30 illustrated is shown as being received within the nut 31 so that unless this nut and filter are in place there will be no abutment for the valve closing spring and the regulator will not be capable of functioning, whereby there will be greater safety and less danger of undesirable grit particles becoming embedded in the valve seat. The valve closing spring has a ratio of diameter to length with the valve closed of about 1 to 4.25 according to Fig. 2 of the drawing.

What is claimed is:

1. In a pressure responsive valve, a casing, a flexible diaphragm clamped within the casing, a movable valve element, a stem for actuating said element from movement of said diaphragm, a valve closing spring cooperating with said casing and said element, an inlet passage in said casing, and an outlet passage also in said casing, said valve being between said passages, the combination therewith of the improvement for suppressing hum of said diaphragm and element, said improvement including said valve closing spring being longer axially than its diameter and at least partially enclosed within a guide passage the walls of which are contiguous to the spring convolutions at least adjacent the center of said spring whereby the spring will flex and contact with the walls of said guide passage and the friction due to such contact opposing hum.

2. A regulator comprising a housing, inlet and outlet passageways structurally and molecularly integral with said housing, a diaphragm clamped to said housing, a valve between said passageways, a stationary valve member structurally and molecularly integral with said housing and comprising a metal wall across a forward end of inlet passageway and provided with a perforation axially of said inlet passageway, a movable valve member comprising a metal holder slidable in said inlet passageway, said holder having at least three ribs projecting from the body of the holder and having side faces between which are formed channels through which incoming fluid may pass around a body portion of said holder, the inner and forward end of said holder being provided with a recess, plastic seat material in said recess, the walls of said recess being provided with a vent adjacent the base of said recess, a plastic seat material in said recess, a stem having an enlarged end anchored in said seat material, a portion of said seat material projecting forwardly from said holder and tapered inwardly and forwardly to around said stem, the perforation in said stationary valve member having a rounded edge which is engaged by said projecting seat material, the end faces of said holder around said seat material being substantially parallel to said wall across said inlet passageway whereby on excessive wear of said seat material a metal to metal seal may be formed, a valve closing spring cooperating with said holder and a rear portion of said inlet passageway, a removable abutment within a rear portion of said inlet passageway and with which said valve closing spring cooperates whereby on removal of said abutment, said holder may be removed out the inlet passageway from said diaphragm for servicing or replacement of its seat material, the rear face of the wall across the forward and inner end of said inlet passageway being at least surfaced with a not readily oxidizable metal whereby heat of impact from a high pressure surge of oxygen will not burn said wall surface, and a spring cooperating with said diaphragm on its side opposite said valve in which the valve closing spring is helical and of a size and length to contact at least some of its convolutions against the inner surface of said inlet passageway, and the expense of an outlet pressure gauge is eliminated by the provision of an adjusting screw for the diaphragm spring having a longitudinal slot across the threads of said screw in which graduations are placed, a cap around said diaphragm spring whereby the diaphragm spring may be given a predetermined setting without the use of a low pressure gauge on the outlet side of said regulator, and a stop ring on said screw to limit backing-off movement thereof.

3. In a fluid pressure regulator having a body portion, inlet and outlet passageways therein, a valve between said passageways having a stationary element and a movable element, seat material carried by the movable element, a flexible diaphragm responsive to pressure in said outlet passageway for actuating said movable valve element, means on the opposite side of said diaphragm away from said valve for opposing the outlet pressure thereon, and a valve stem between said diaphragm and movable valve element, the combination therewith of the improvement for suppressing hum without having to have an additional spring frictionally engaging some portion of the movable valve element or its actuating means, said improvement comprising a valve closing spring within said inlet passageway, said spring having a ratio of diameter to length when the valve is closed of about 1 to 4.25 and at least some convolutions of said spring being contiguous the walls of said inlet passageway to provide a slight frictional resistance to hum.

4. In a fluid pressure regulator, a housing, inlet and outlet passageways structurally and molecularly integral with said housing, a diaphragm clamped to said housing, a valve between said passageways, a stationary valve member structurally and molecularly integral with said housing and comprising a metal wall across a forward end of inlet passageway and provided with a perforation axially of said inlet passageway, a movable valve member comprising a metal holder slidable in said inlet passageway, said holder having at least three ribs projecting from the body of the holder and having side faces between which are formed channels through which incoming fluid may pass around a body portion of said holder, the inner and forward end of said holder being provided with a recess, plastic seat material in said recess, the walls of said recess being provided with a vent adjacent the base of said recess, a plastic seat material in said recess, a stem having an enlarged end anchored in said seat material, a portion of said seat material projecting forwardly from said holder and tapered inwardly and forwardly to around said stem, the perforation in said stationary valve member having a rounded edge which is engaged by said projecting seat material, the end faces of said holder around said seat material being substantially parallel to said wall across said inlet passageway whereby on excessive wear of said seat material a metal to metal seal may be formed, a valve closing spring cooperating with said holder and a rear portion of said inlet passageway, a removable abutment within a rear portion of said inlet passageway and with which said valve closing spring cooperates whereby on removal of said abutment, said holder may be removed out the inlet passageway away from said diaphragm for servicing or replacement of its seat material, the rear face of the wall across the forward and inner end of said inlet passageway being at least surfaced with a not readily oxidizable metal whereby heat of impact from a high pressure surge of oxygen will not burn said wall surface, and a spring cooperating with said diaphragm on its side opposite said valve, the improvement comprising a valve closing spring within said inlet passageway, said spring having a ratio of diameter to length when the valve is closed of about 1 to 4.25 and at least some convolutions of said spring being contiguous the walls of said inlet passageway to provide a slight frictional resistance to hum.

References Cited in the file of this patent

UNITED STATES PATENTS

| Number | Name | Date |
|---|---|---|
| 1,079,600 | Kennedy | Nov. 25, 1913 |
| 1,225,084 | Von Sick | May 8, 1917 |
| 1,746,220 | Manning | Feb. 4, 1930 |
| 1,972,748 | Smith | Sept. 4, 1934 |
| 2,057,150 | Kehl et al. | Oct. 13, 1936 |
| 2,080,666 | Leutwiler | May 18, 1937 |
| 2,095,210 | Bucknam | Oct. 5, 1937 |
| 2,161,544 | Baker | June 6, 1939 |
| 2,178,444 | Ware | Oct. 31, 1939 |
| 2,237,554 | Grove | Apr. 8, 1941 |
| 2,272,243 | Jacobsson | Feb. 10, 1942 |
| 2,300,498 | Goff | Nov. 3, 1942 |
| 2,478,040 | Campbell | Aug. 2, 1949 |
| 2,536,505 | Kircher | Jan. 2, 1951 |
| 2,558,651 | Ives | June 26, 1951 |
| 2,595,012 | Smith | Apr. 29, 1952 |
| 2,595,156 | Matosovic | Apr. 29, 1952 |
| 2,641,278 | Eplett | June 9, 1953 |
| 2,664,672 | Ey | Jan. 5, 1954 |
| 2,682,638 | Herod | June 29, 1954 |

FOREIGN PATENTS

| Number | Country | Date |
|---|---|---|
| 11,477 | Great Britain | 1886 |
| 534,842 | France | Apr. 3, 1922 |
| 552,052 | France | Apr. 23, 1923 |

OTHER REFERENCES

Flow and Measurement of Air and Gases, by Alex. B. Eason, published by Charles Griffin and Co., Ltd., London, 1930, p. 207.